(12) United States Patent
Tabata

(10) Patent No.: US 10,774,675 B2
(45) Date of Patent: Sep. 15, 2020

(54) INTERNAL COMBUSTION ENGINE

(71) Applicant: TOYOTA JIDOSHA KABUSHIKI KAISHA, Toyota-shi, Aichi-ken (JP)

(72) Inventor: Masakazu Tabata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/272,563

(22) Filed: Feb. 11, 2019

(65) Prior Publication Data

US 2019/0309648 A1 Oct. 10, 2019

(30) Foreign Application Priority Data

Apr. 6, 2018 (JP) .................................. 2018-073856

(51) Int. Cl.
| | | |
|---|---|---|
| *F01D 17/16* | (2006.01) | |
| *F02C 6/12* | (2006.01) | |
| *F02B 37/02* | (2006.01) | |

(52) U.S. Cl.
CPC ............ *F01D 17/162* (2013.01); *F02B 37/02* (2013.01); *F02C 6/12* (2013.01); *F05B 2220/40* (2013.01); *F05D 2220/40* (2013.01)

(58) Field of Classification Search
CPC .......... F01D 17/162; F01D 1/20; F01D 9/026; F02B 37/02; F02C 6/12; F04D 25/024; F04D 25/04; F04D 29/051; F04D 17/025; F05B 2220/40; F05D 2220/40

See application file for complete search history.

(56) References Cited

U.S. PATENT DOCUMENTS

| | | | | |
|---|---|---|---|---|
| 4,100,742 A | * | 7/1978 | Harp, Jr. ................. | F02B 37/02 60/602 |
| 4,184,812 A | * | 1/1980 | Nomura .................... | F01D 9/04 415/214.1 |
| 4,196,593 A | * | 4/1980 | Froeliger .............. | F02B 37/004 60/612 |

(Continued)

FOREIGN PATENT DOCUMENTS

| | | |
|---|---|---|
| DE | 10 2013 216 112 A1 | 2/2015 |
| JP | 2017-145748 A | 8/2017 |

OTHER PUBLICATIONS

Kume; "Honeywell's Turbocharger—Technologies used at Le Mans will hit the public road in 2017"; Nikkei Automative September issue, No. 66, Nikkei Business Publications, Inc.; Aug. 2015, pp. 22-23.

(Continued)

*Primary Examiner* — Jesse S Bogue
(74) *Attorney, Agent, or Firm* — Oliff PLC

(57) ABSTRACT

An internal combustion engine is equipped with a turbocharger that includes: a centrifugal compressor impeller; an axial flow turbine wheel coupled to the compressor impeller via a rotational shaft; a bearing that supports the rotational shaft; and a housing that houses at least the compressor impeller and the bearing among the compressor impeller, the bearing and the turbine wheel. The turbine wheel is coupled to the rotational shaft such that an outlet of turbine blades of the turbine wheel is located on the side of the compressor impeller. The compressor impeller is arranged such that an inlet of the compressor impeller becomes closer to the turbine wheel than an outlet of the compressor impeller.

3 Claims, 3 Drawing Sheets

(56) References Cited

U.S. PATENT DOCUMENTS

| | | | | |
|---|---|---|---|---|
| 5,025,629 | A * | 6/1991 | Woollenweber | F01D 17/141 |
| | | | | 415/160 |
| 6,824,355 | B2 * | 11/2004 | Behrendt | F01D 17/162 |
| | | | | 415/160 |
| 8,181,462 | B2 * | 5/2012 | Arnold | F01D 5/048 |
| | | | | 60/612 |
| 10,060,335 | B2 * | 8/2018 | Kindl | F02B 37/007 |
| 10,087,939 | B2 * | 10/2018 | Eckl | F02B 37/004 |
| 2006/0260309 | A1 * | 11/2006 | Arnold | F01D 17/143 |
| | | | | 60/605.1 |
| 2009/0026009 | A1 | 1/2009 | Itoh | |
| 2014/0147242 | A1 | 5/2014 | Ghasripoor et al. | |
| 2015/0007563 | A1 | 1/2015 | Wade | |
| 2015/0007800 | A1 | 1/2015 | Wade et al. | |
| 2015/0159660 | A1 * | 6/2015 | Kares | F01D 5/021 |
| | | | | 417/406 |
| 2016/0115802 | A1 | 4/2016 | Grissom et al. | |
| 2016/0160672 | A1 | 6/2016 | Takata et al. | |
| 2016/0160756 | A1 | 6/2016 | McGahey et al. | |
| 2019/0309648 | A1 | 10/2019 | Tabata | |
| 2019/0309676 | A1 * | 10/2019 | Tabata | F01D 1/04 |

OTHER PUBLICATIONS

May 1, 2020 Office Action issued in U.S. Appl. No. 16/283,445.
U.S. Appl. No. 16/283,445, filed Feb. 22, 2019 in the name of Tabata.

* cited by examiner

Comparative Example

INTERNAL COMBUSTION ENGINE

CROSS-REFERENCE TO RELATED APPLICATION

This application is based on and claims the benefit of Japanese Patent Application No. 2018-073856, filed on Apr. 6, 2018, which is incorporated by reference herein in its entirety.

BACKGROUND

Technical Field

The present disclosure relates to an internal combustion engine, and more particularly to an internal combustion engine equipped with a turbocharger that includes a centrifugal compressor and an axial flow turbine.

Background Art

For example, JP 2017-145748 A discloses an internal combustion engine equipped with a turbocharger. This turbocharger includes a compressor, a turbine for supercharging, which is driven to rotate the compressor, and a turbine for generating electric power, which is driven to rotate a generator. The turbine for generating electric power is axial flow type. More specifically, a wheel of the turbine for generating electric power is arranged downstream of the wheel of the turbine for supercharging, and is coupled to the generator via a rotational shaft.

SUMMARY

In order to rotationally drive a centrifugal compressor, an internal combustion engine may be equipped with a turbocharger that includes an axial flow turbine. In this turbocharger, a compressor impeller of the centrifugal compressor and a turbine wheel of the axial flow turbine are coupled to each other via a rotational shaft. In this kind of turbocharger, the turbine wheel may be coupled to the rotational shaft such that an inlet of turbine blades of the turbine wheel is located on the side of the compressor impeller. However, if this kind of configuration is adopted, in order to introduce exhaust gas into the inlet of the turbine blades located between the compressor impeller and the turbine wheel, it is required to include a scroll portion formed at a location of an exhaust gas passage on the upstream side of the turbine blades. Shortening of the distance from a cylinder to the inlet of the turbine blades is effective to increase the energy of the exhaust gas that flows into the turbine wheel. However, forming the scroll portion described above impedes the shortening of the distance from the cylinder to the inlet of the turbine blades.

Accordingly, the turbine wheel may be coupled to the rotational shaft such that an outlet of the turbine blades is located on the side of the compressor impeller, contrary to the above. However, if this kind of configuration is adopted, the following issue may occur.

A compressor impeller of a centrifugal compressor is generally arranged such that an outlet of the compressor impeller becomes closer to a turbine than an inlet thereof. As a result, a force due to a pressure difference of gas is applied to a rotator (i.e., assembly of the compressor impeller, a rotational shaft and a turbine wheel) as follows. More specifically, the pressure on the outlet side of a turbine blades becomes lower than the pressure on the inlet side of the turbine blades. Thus, due to this pressure difference, a force to pull the rotator from the side of the turbine wheel to the side of the compressor impeller is applied to the turbine wheel. On the other hand, the pressure on the outlet side of the compressor impeller becomes higher than the pressure on the inlet side of the compressor impeller. Thus, the direction of the force applied to the compressor impeller due to this pressure difference becomes equal to the direction of the above-described force applied to the turbine wheel. As a result of the resultant force of these forces being applied to the rotator, a load applied to a bearing that supports the rotational shaft becomes higher.

The present disclosure has been made to address the problem described above, and an object of the present disclosure is to provide an internal combustion engine equipped with a turbocharger including an axial flow turbine wheel, which can favorably achieve both reduction of increase of a load applied to a bearing due to the pressure difference described above and increase of energy of exhaust gas flowing into the turbine wheel.

An internal combustion engine according to the present disclosure includes a turbocharger including: a centrifugal compressor impeller; an axial flow turbine wheel coupled to the compressor impeller via a rotational shaft; a bearing that supports the rotational shaft; and a housing that houses at least the compressor impeller and the bearing among the compressor impeller, the bearing and the turbine wheel. The turbine wheel is coupled to the rotational shaft such that an outlet of turbine blades of the turbine wheel is located on a side of the compressor impeller. The compressor impeller is arranged such that an inlet of the compressor impeller becomes closer to the turbine wheel than an outlet of the compressor impeller.

The bearing may be arranged at a portion of the rotational shaft located between the compressor impeller and the turbine wheel. The turbocharger may further include: a scroll portion through which gas that has flown out from the compressor impeller flows; and an oil seal portion interposed between a portion of the housing located between the bearing and the compressor impeller, and the rotational shaft. The housing may include a communication passage that causes a gap located between the housing and the rotational shaft at a location closer to the compressor impeller than the oil seal portion to communicate with the scroll portion.

The internal combustion engine may include a cylinder head. The housing may be fastened to the cylinder head directly or with a gasket interposed between the housing and the cylinder head such that the turbine wheel is opposed to the cylinder head.

According to the internal combustion engine of the present disclosure, the axial flow turbine wheel is coupled to the rotational shaft such that the outlet of the turbine blades is located on the side of the compressor impeller. Thus, contrary to a radial turbine, it is not required to include a scroll portion on the inlet side of the turbine blades. Therefore, the distance from a cylinder to the inlet of the turbine blades can be shortened. As a result, the energy of exhaust gas that flows into the turbine wheel can be increased. In addition, according to the internal combustion engine of the present disclosure, the compressor impeller is arranged such that the inlet of the compressor impeller becomes closer to the turbine wheel than the outlet of the compressor impeller. As a result, according to the turbocharger of the present disclosure, the direction of a force applied to the compressor impeller due to a pressure difference between the upstream and downstream of the compressor impeller becomes opposite to the direction of a force applied to the turbine wheel due to a pressure difference between the upstream and downstream of the turbine wheel. Therefore, according to the internal combustion engine of the present disclosure, both of reduction of increase of the load applied to the bearing and increase of energy of the exhaust gas flowing into the turbine wheel can be favorably achieved.

DETAILED DESCRIPTION

Figure 1:
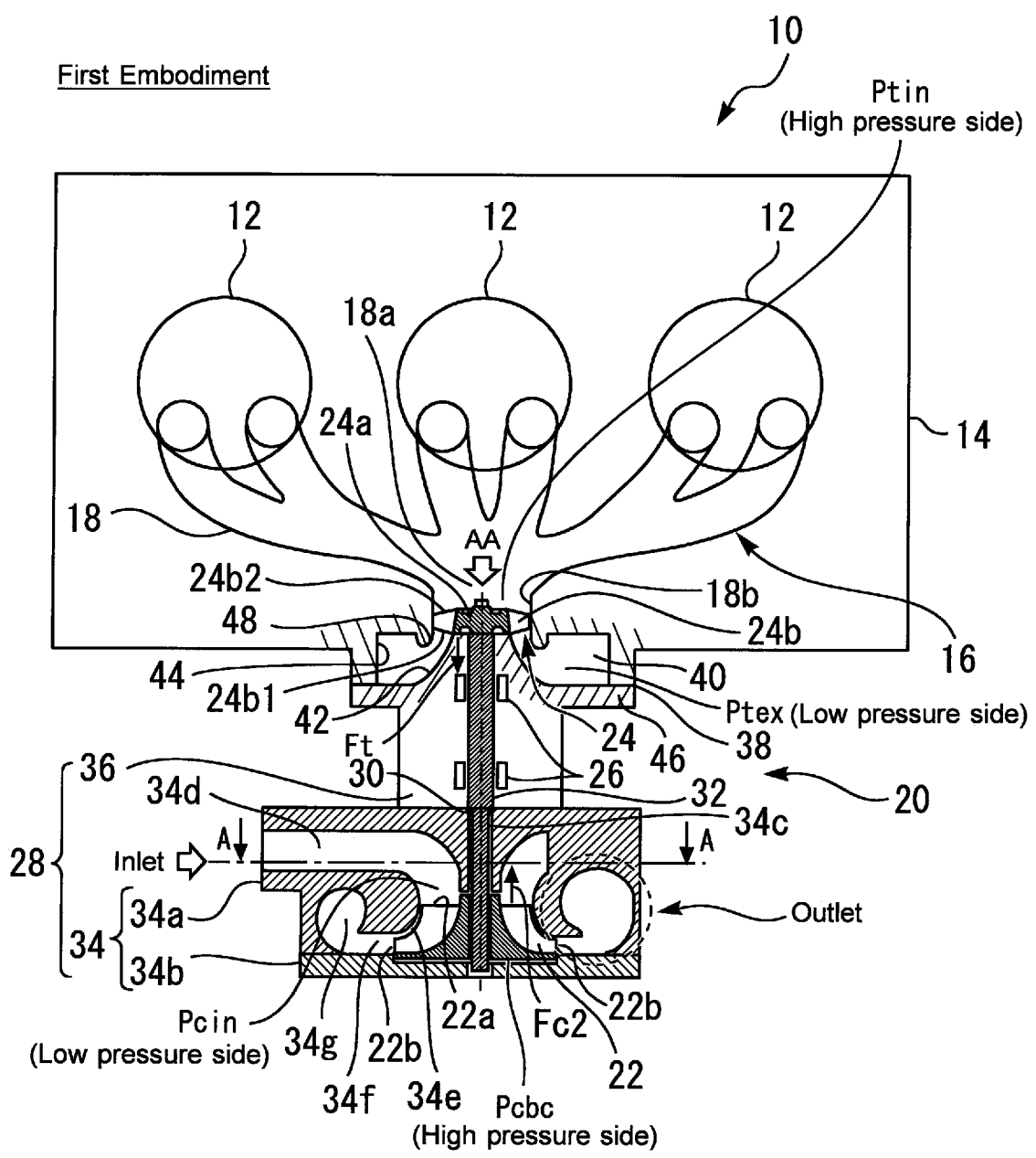
FIG. 1 is a diagram that schematically illustrates the configuration of a main part of an internal combustion engine according to a first embodiment of the present disclosure.

In embodiments of the present disclosure which will be described later, elements that are the same as each other in the drawings are denoted by the same reference symbols, and redundant descriptions of those elements will be omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or the like that are described in conjunction with the following embodiments are not necessarily essential to the present disclosure unless explicitly shown otherwise, or unless the present disclosure is explicitly specified by the structures or the like theoretically.

1. First Embodiment

Firstly, a first embodiment according to the present disclosure and a modification example thereof will be described with reference to FIGS. 1 to 4.

1-1. Configuration of Main Part of Internal Combustion Engine

FIG. 1 is a diagram that schematically illustrates the configuration of a main part of an internal combustion engine 10 according to the first embodiment of the present disclosure. The internal combustion engine 10 shown in FIG. 1 is, as an example, an in-line three-cylinder engine having three cylinders 12. The internal combustion engine 10 is equipped with a cylinder head 14. The cylinder head 14 forms the three cylinders 12 in association with a cylinder block (not shown). It should be noted that the number and arrangement of cylinders of the internal combustion engine according to the present disclosure are not particularly limited.

1-1-1. Cylinder Head

A cooling water passage (not shown) through which engine cooling water flows is formed in the cylinder head 14. That is to say, the cylinder head 14 is water-cooled type. Also, the internal combustion engine 10 is provided with an exhaust gas passage 16 through which exhaust gas discharged from each cylinder 12 flows. The exhaust gas passage 16 includes an in-cylinder-head gas passage 18 formed inside the cylinder head 14 as shown in FIG. 1. The in-cylinder-head gas passage 18 is formed so as to making exhaust gases from the respective cylinders 12 converge into one flow. In other words, in the internal combustion engine 10, an exhaust manifold is integrated with the cylinder head 14. It should be noted that the cylinder head 14 is configured by a metal material (for example, aluminum alloy).

1-1-2. Turbocharger

The internal combustion engine 10 is equipped with a turbocharger 20. The turbocharger 20 includes a compressor impeller 22, an axial flow turbine wheel 24, bearings 26, a housing 28 and an oil seal portion 30. It should be noted that the housing 28 is configured by a metal material (for example, iron).

To be more specific, the turbine wheel 24 is coupled to the compressor impeller 22 via a rotational shaft 32. The bearings 26 support the rotational shaft 32 at, for example, portions located between the compressor impeller 22 and the turbine wheel 24 (in the example shown in FIG. 1, two portions). In addition, the number of "bearings" according to the present disclosure is not limited to two, and may be one or three or more. The housing 28 includes a compressor housing portion 34 that houses the compressor impeller 22 and a bearing housing portion 36 that houses the two bearings 26. The compressor housing portion 34 and the bearing housing portion 36 are adjacent to each other. The compressor housing portion 34 includes a pair of housing pieces 34a and 34b. The oil seal portion 30 is interposed between a portion 34c of the compressor housing portion 34 (more specifically, housing piece 34a) and the rotational shaft 32. This portion 34c is located between one of the bearings 26 (more specifically, the bearing 26 located closer to the compressor impeller 22 than the other of the bearings 26) and the compressor impeller 22. In addition, each of the bearings 26 includes a thrust bearing for restricting the movement of the rotational shaft 32 in the axial direction thereof.

1-1-2-1. Axial Flow Turbine Wheel

The turbine wheel 24 includes a rotor disc 24a and a plurality of turbine blades (i.e., rotor blades) 24b. The rotor disc 24a is coupled to the rotational shaft 32. The plurality of turbine blades 24b are formed integrally with the rotor disc 24a such that they extend outward in the radial direction from the rotor disc 24a. Also, as shown in FIG. 1, the turbine wheel 24 is coupled to the rotational shaft 32 such that an outlet 24b1 of the turbine blades 24b is located at the side of the compressor impeller 22.

1-1-2-2. Example of Installation of Turbocharger on Internal Combustion Engine

According to the example shown in FIG. 1, the housing 28 is directly fastened to the cylinder head 14, using a fastener (not shown), such as bolt, such that (the inlet 24b2 of the turbine blades 24b of) the turbine wheel 24 is opposed to the cylinder head 14. To be more specific, according to the example shown in FIG. 1, the bearing housing portion 36 included in components of the housing 28 is directly fastened to the cylinder head 14. It should be noted that, in the configuration shown in FIG. 1, a gasket (which corresponds to an example of the "gasket" according to the present disclosure) may be interposed, at a fastening surface 38 of the bearing housing portion 36 with respect to the cylinder head 14, between the cylinder head 14 and the bearing housing portion 36. In addition, in FIG. 1, the respective portions of the cylinder head 14 and bearing housing portion 36 located around the turbine wheel 24 with hatching indicate cross-sections of the cylinder head 14 and bearing housing portion 36 at the center position of the rotational shaft 32. This also applies to FIG. 3 described later.

1-1-2-3. Turbine Outlet Passage

According to the internal combustion engine 10 of the present embodiment, a turbine outlet passage 40 that is an outlet passage of the turbine wheel 24 is formed, with a structure as described below, using the wall surface of the bearing housing portion 36 and the wall surface of the cylinder head 14.

Specifically, a turbine outlet wall portion 42 of the bearing housing portion 36 is formed at a location closer to the outlet 24b1 of the turbine blades 24b in the axial direction of the rotational shaft 32. The turbine outlet wall portion 42 is formed such that the diameter thereof becomes greater at a location farther away from the outlet 24b1 of the turbine blades 24b in the axial direction of the rotational shaft 32 (i.e., in other words, formed in a substantially frusto-conical shape). The cylinder head 14 includes a scroll portion 44 formed so as to cover this turbine outlet wall portion 42. Also, the bearing housing portion 36 includes a flange portion 46 formed so as to extend in the radial direction of the rotational shaft 32. In more detail, the fastening between the cylinder head 14 and the bearing housing portion 36 are made between an end surface of this scroll portion 44 and the flange portion 46. That is to say, a part of this flange portion 46 corresponds to the fastening surface 38 described above.

The turbine outlet passage 40 is configured by the scroll portion 44 and the flange portion 46 in addition to the turbine outlet wall portion 42. The scroll portion 44 has a scroll shape in order to change the flow direction of the exhaust gas that has flown out from the outlet 24b1 of the turbine blades 24b. To be more specific, the scroll portion 44 has a scroll shape that centers on the rotational shaft 32 and is formed such that the flow passage cross-sectional area gradually becomes greater at a location farther away from the outlet 24b1. The flow passage cross-sectional area of a portion of the turbine outlet passage 40 located on the right side of the sheet of FIG. 1 relative to the turbine outlet wall portion 42 is depicted so as to be greater than that of a portion located on the left side of the sheet. That is to say, the portion on the right side of the sheet is located on the downstream side of the exhaust gas flow as compared to the portion on the left side of the sheet. In addition, the turbine outlet passage 40 configured as described above corresponds to a part of the exhaust gas passage 16. It should be noted that the scroll portion that forms the turbine outlet passage may be formed in a bearing housing portion with a shape change of the flange portion 46, instead of the example in which the scroll portion 44 is formed in the cylinder head 14.

It should be noted that, according to the present embodiment, an end portion (not shown) of the scroll portion 44 located on the downstream side of the exhaust gas flow is arranged outside the cylinder head 14, as an example. An exhaust pipe that forms a portion of the exhaust gas passage 16 located on the downstream side of the turbocharger 20 is connected to this end portion. In addition, an annular protrusion 48 that is formed in the scroll portion 44 at a portion near the outlet 24b1 of the turbine blades 24b is arranged to smooth the exhaust gas flow flowing out from the outlet 24b1. In more detail, if a flow passage is abruptly enlarged, the flow loss increases. In order not to increase this kind of flow loss, the annular protrusion 48 is formed so as to be able to gradually increase the flow passage cross-sectional area.

Additionally, in the example shown in FIG. 1, function of a turbine housing that houses the turbine wheel 24 is achieved by the use of the cylinder head 14 (more specifically, a peripheral surface 18b of the in-cylinder-head gas passage 18 and the scroll portion 44). Also, the turbine outlet passage 40 is configured by the bearing housing portion 36 (i.e., the turbine outlet wall portion 42 and the flange portion 46) and the scroll portion 44 as described above. Thus, according to the internal combustion engine 10, an axial flow turbine that rotationally drives the compressor impeller 22 is configured with the turbine wheel 24, the peripheral surface 18b and scroll portion 44 of the cylinder head 14, and the bearing housing portion 36 (i.e., the turbine outlet wall portion 42 and the flange portion 46).

1-1-2-4. Centrifugal Compressor

Figure 2:
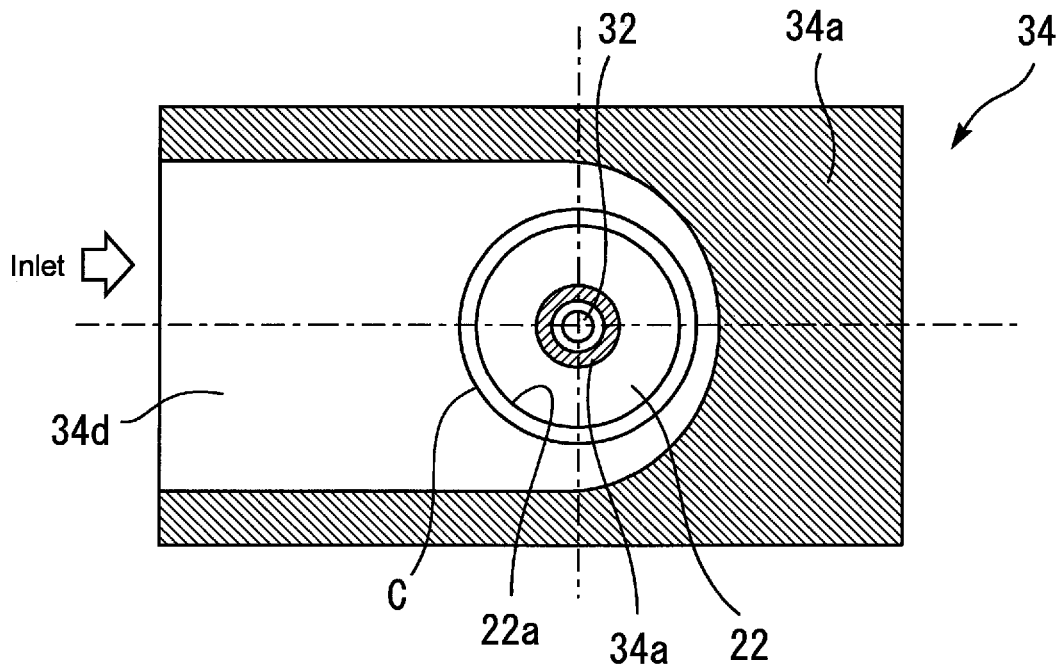
FIG. 2 is a schematic cross-sectional view of a compressor housing portion taken long the line A-A in FIG. 1.

Next, a detailed configuration of a centrifugal compressor having the compressor impeller 22 described above will be described with reference to FIGS. 1 and 2. FIG. 2 is a schematic cross-sectional view of the compressor housing portion 34 taken long the line A-A in FIG. 1. It should be noted that a circle C shown in FIG. 2 indicates the opening of a compressor inlet portion 34d whose position in the axial direction is the same as that of the inlet 22a of the compressor impeller 22.

The compressor impeller 22 is arranged such that the inlet 22a thereof becomes closer to the turbine wheel 24 than the outlet 22b thereof. In detail, the compressor housing portion 34 forms, with a pair of housing pieces 34a and 34b, the compressor inlet portion 34d, an impeller portion 34e, a diffuser portion 34f and a scroll portion 34g.

The compressor inlet portion 34d is formed in the housing piece 34a at a location closer to the turbine wheel 24 than the compressor impeller 22 as shown in FIG. 1. A gas inlet (air inlet) of the compressor inlet portion 34d opens at an outer peripheral surface of the housing piece 34a. A gas passage in the compressor inlet portion 34d is formed in the housing piece 34a so as to extend toward the inner side from the outer side along the radial direction of the rotational shaft 32 and then to bend toward the inlet 22a of the compressor impeller 22.

The diffuser portion 34f is a disk-shaped gas passage located on the outer peripheral side relative to the outlet 22b of the compressor impeller 22 (i.e., the outlet of the impeller portion 34e). The gas that has flown out from the compressor impeller 22 flows through the diffuser portion 34f and then flows inside the scroll portion 34g. The scroll portion 34g has a scroll shape that centers on the rotational shaft 32 and is formed such that the flow passage cross-sectional area gradually becomes greater at a location further downstream of the gas flow. The flow passage cross-sectional area of a portion of the scroll portion 34g located on the right side of the sheet of FIG. 1 with respect to the compressor impeller 22 is depicted so as to become greater than that of a portion thereof located on the left side of the sheet. That is to say, the portion on the right side of the sheet is located on the downstream side of the gas flow as compared to the portion on the left side of the sheet. The gas passages formed in the compressor housing portion 34 serves as a part of the intake air passage of the internal combustion engine 10.

The centrifugal compressor for supercharging the intake air of the internal combustion engine 10 is configured with the compressor housing portion 34 and the compressor impeller 22 that are described above.

1-1-2-5. Example of Configuration Around Turbine Blades

Moreover, as shown in FIG. 1, according to the internal combustion engine 10, the inlet 24b2 of the turbine blades 24b is arranged at the upstream side of the exhaust gas flow relative to the fastening surface 38 of the bearing housing portion 36 with respect to the cylinder head 14. Also, the turbine wheel 24 is arranged in the in-cylinder-head gas passage 18. To be more specific, the turbine wheel 24 is arranged at a collective portion 18a of the in-cylinder-head gas passage 18, and the peripheral surface 18b of the in-cylinder-head gas passage 18 is opposed to the turbine blades 24b in the radial direction of the turbine wheel 24. In other words, the turbine blades 24b (turbine wheel 24) form a clearance with the peripheral surface 18b.

1-2. Advantageous Effects
1-2-1. Increase of Energy of Exhaust Gas Flowing into Turbine It is required for an internal combustion engine equipped with a turbocharger using a radial turbine to include a scroll portion located on the inlet side of turbine blades and a pipe connecting the scroll portion with a portion of an exhaust gas passage located on the upstream side of the scroll portion. In contrast to this, the internal combustion engine 10 according to the present embodiment is equipped with the turbocharger 20 having the axial flow turbine wheel 24 that is arranged such that the outlet 24b1 of the turbine blades 24b is located on the side of the compressor impeller 22. Because of this, contrary to the radial turbine, it is not required to include a scroll portion located on the inlet 24b2 side of the turbine blades 24b, and the above-described pipe thus becomes unnecessary. Therefore, the distance from each cylinder 12 to the inlet 24b2 of the turbine blades 24b can be shortened. As a result, the surface area of a portion of the exhaust gas passage located on the upstream side of the turbine blades 24b is reduced, whereby a decrease of the temperature of the exhaust gas that flows into the turbine blades 24b can be reduced. Also, the volume of the portion of the exhaust gas passage located on the upstream side of the turbine wheel 24 is reduced, whereby a decrease of the pressure of the exhaust gas that flows into the turbine wheel 24 can be reduced. As just described, according to the present embodiment, the configuration that can effectively increase the energy of the exhaust gas that flows into the turbine wheel 24 is achieved due to the shortening of the distance described above.

In addition, according to the internal combustion engine 10, the turbine wheel 24 is arranged in the in-cylinder-head gas passage 18. This can more sufficiently achieve advantageous effects of increase of the exhaust energy supplied to the turbine wheel 24 due to the shortening of the distance described above.

1-2-2. Reduction of Increase of Load Applied to Bearings 26

Figure 3:
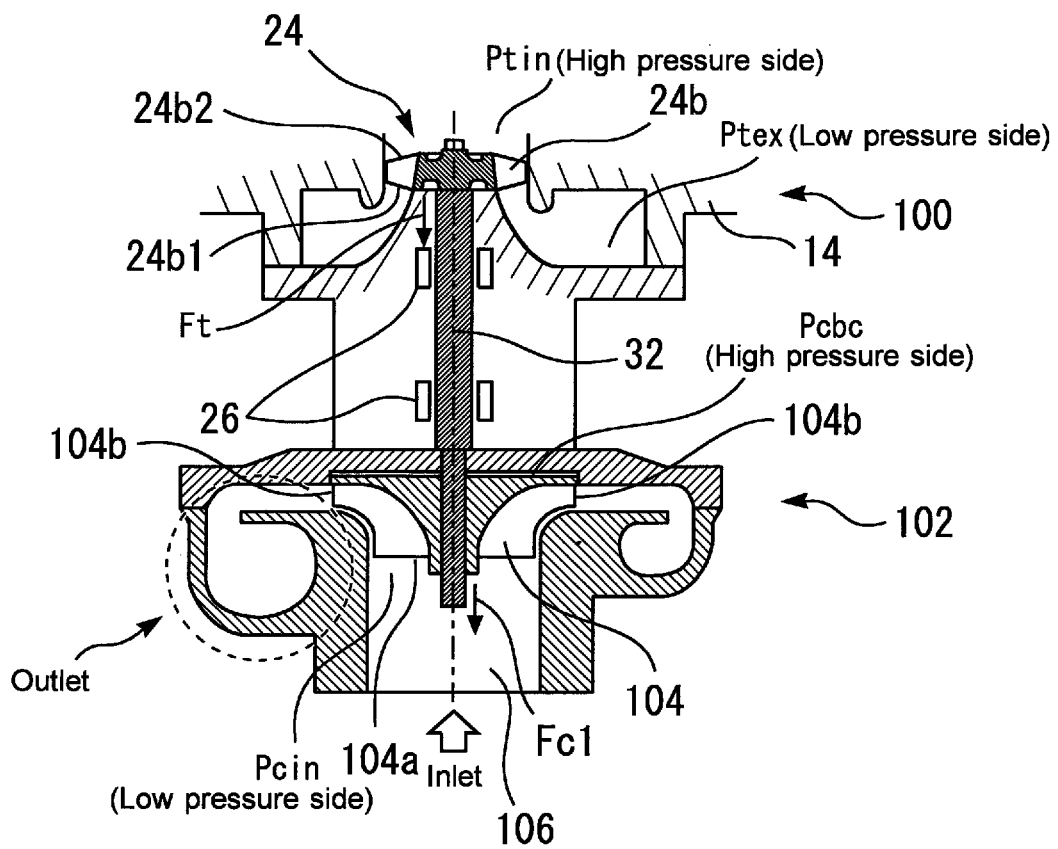
FIG. 3 is a schematic diagram for describing the configuration of an internal combustion engine represented for comparison with the internal combustion engine shown in FIG. 1.

FIG. 3 is a schematic diagram for describing the configuration of an internal combustion engine 100 represented for comparison with the internal combustion engine 10 shown in FIG. 1. The differences of the internal combustion engine 100 with respect to the internal combustion engine 10 are herein described. The internal combustion engine 100 is different from the internal combustion engine 10 shown in FIG. 1 in terms of the configuration of the centrifugal compressor.

Specifically, a centrifugal compressor which a turbocharge 102 of the internal combustion engine 100 includes has the same configuration as that of general centrifugal compressors. The centrifugal compressor is equipped with a compressor impeller 104. The compressor impeller 104 is arranged such that an inlet 104a thereof becomes farther away from the turbine wheel 24 than an outlet 104b thereof.

As a result, a force due to a pressure difference of gas is applied to a rotator (i.e., assembly of the compressor impeller 104, the rotational shaft 32 and the turbine wheel 24) as follows.

More specifically, pressure Ptex on the outlet 24b1 side of the turbine blades 24b becomes lower than pressure Pein on the inlet 24b2 side of the turbine blades 24b. Thus, due to this pressure difference, a force Ft to pull the rotator from the side of the turbine wheel 24 to the side of the compressor impeller 104 is applied to the turbine wheel 24. On the other hand, pressure Pcbc acting on the back surface of the compressor impeller 104 becomes higher than pressure Pcin on the inlet 104a side of the compressor impeller 104. Thus, the direction of a force Fc1 applied to the compressor impeller 104 due to this pressure difference becomes equal to the direction of the above-described force Ft applied to the turbine wheel 24. As just described, these forces Ft and Fc1 are both applied so as to pull the rotator to the side of the compressor impeller 104. As a result, a load applied to the bearings 26 that support the rotational shaft 32 becomes higher.

In contrast to the above, according to the turbocharger 20 of the present embodiment, the compressor impeller 22 is arranged such that the inlet 22a thereof becomes closer to the turbine wheel 24 than the outlet 22b thereof. As a result, although the force Tt applied to the turbine wheel 24 due to the pressure difference is the same as that of the comparative example shown in FIG. 3, the direction of a force Fc2 applied to the compressor impeller 22 due to the pressure difference becomes opposite to the direction of the above-described force Ft applied to the turbine wheel 24, contrary to the comparative example described above. That is to say, according to the configuration of the present embodiment, the force Ft on the turbine side and the force Fc2 on the compressor side can be counterbalanced with each other. Therefore, according to the internal combustion engine 10 of the present embodiment, reduction of increase of the load applied to the bearings 26 and increase of energy of the exhaust gas flowing into the turbine wheel 24 can be both favorably achieved.

1-2-3. Advantageous Effects Concerning Fastening of Turbocharger to Cylinder Head Similarly to the turbocharger 20 according to the present embodiment, the turbocharger 102 according to the comparative example shown in FIG. 3 is also directly fastened to the cylinder head 14 such that (the inlet 24b2 of the turbine blades 24b of) the turbine wheel 24 is opposed to the water-cooled cylinder head 14. However, according to this comparative example, the inlet 104a of the compressor impeller 104 is located farther away from the cylinder head 14 as compared to the outlet 104b thereof. Also, according to the comparative example, the opening of a compressor inlet portion 106 is located farthest away from the cylinder head 14 in the axial direction of the rotational shaft 32 among the components of the turbocharger 102. As a result, a compressor upstream pipe (not shown) connected to this compressor inlet portion 106 is arranged at a portion near at least the compressor inlet portion 106 such that this pipe becomes farther away from the cylinder head 14 in the axial direction of the rotational shaft 32. Therefore, in terms of actual installation of the internal combustion engine 100 on a vehicle, it becomes difficult to obtain an installation location of the compressor upstream pipe within a limited space in the engine compartment (in particular, transverse mounted engine).

In contrast to the above, according to the turbocharger 20 of the present embodiment, the compressor impeller 22 is arranged such that the inlet 22a thereof becomes closer to the turbine wheel 24 than the outlet 22b thereof. As a result, as shown in FIG. 1, the opening of the compressor inlet portion 34d is arranged, at a location that can make the distance from the cylinder head 14 shorter than the distance from an end of the turbocharger 20 in the axial direction of the rotational shaft 32, so as to face a direction orthogonal to the axial direction (i.e., radial direction). Therefore, as compared to the comparative example described above, the installation location of the compressor upstream pipe can be easy to be obtained. In addition, according to the internal combustion engine 10 of the present embodiment, the following advantageous effects can also be achieved.

Firstly, the effects of reduction of temperature increase of the bearings 26 can be achieved. Specifically, if the outlet 24b1 of the turbine blades 24b is arranged so as to face the side of the compressor impeller 22 as shown in FIG. 1, a high-temperature exhaust gas that has passed through the turbine blades 24b flows toward the side of the compressor impeller 22 (i.e., the side of the bearings 26 located between the turbine wheel 24 and the compressor impeller 22). Because of this, there is a possibility that, if proper measures are not taken, the temperature of the bearings 26 may increase. In terms of this issue, according to the present embodiment, the housing 28 of the turbocharger 20 is directly fastened to the cylinder head 14 such that (the inlet 24b2 of the turbine blades 24b of) the turbine wheel 24 is opposed to the water-cooled cylinder head 14. Thus, the heat that transmits to the housing 28 from a high-temperature exhaust gas flowing out from the turbine blades 24b can be released to a low-temperature cylinder head 14. Therefore, the effects of reduction of temperature increase of the bearings 26 can be achieved. In addition, what is directly fastened to the cylinder head 14 in the present embodiment is the bearing housing portion 36 that houses the bearings 26. Therefore, according to the present configuration, the heat that transmits to the bearing housing portion 36 from a high-temperature exhaust gas flowing out from the turbine blades 24b can be effectively released to the cylinder head 14. Also, it can be said that this effects become greater in the example in which the bearing housing portion 36 is directly fastened to the cylinder head 14 as with the internal combustion engine 10 according to the present embodiment than in the example in which a gasket is interposed between the cylinder head 14 and the bearing housing portion 36.

Furthermore, reduction of thermal radiation to the turbine blades 24b can also be achieved. Specifically, according to the internal combustion engine 10 of the present embodiment, the inlet 24b2 of the turbine blades 24b is arranged on the upstream side of the fastening surface 38 of the bearing housing portion 36 with respect to the cylinder head 14 in the exhaust gas flow direction. According to this kind of arrangement, the turbine blades 24b are installed at a portion near the wall surface of the cylinder head 14 cooled by engine cooling water. It can thus be said that the temperature of the wall surface of passage of the exhaust gas located upstream of the turbine blades 24b becomes lower as compared to an example in which the turbine blades 24b are arranged outside the cylinder head 14. As a result, since the inflow of heat by the thermal radiation to the turbine blades 24b from the wall surface of the passage is reduced, an increase of the temperature of the rotational shaft 32 coupled to the turbine wheel 24 due to the thermal radiation described above is reduced. This leads to reduction of increase of the temperature of the bearings 26.

In addition, according to the internal combustion engine 10 of the present embodiment, the turbine wheel 24 is arranged in the in-cylinder-head gas passage 18. More specifically, according to this turbine wheel 24, the turbine blades 24b are opposed to the peripheral surface 18b of the in-cylinder-head gas passage 18 in the radial direction of the turbine wheel 24. With this kind of configuration, the effects of reduction of the thermal radiation described above can be more effectively achieved.

1-3. Another Example of Flow Passage Shape of Compressor Inlet Portion

Figure 4:
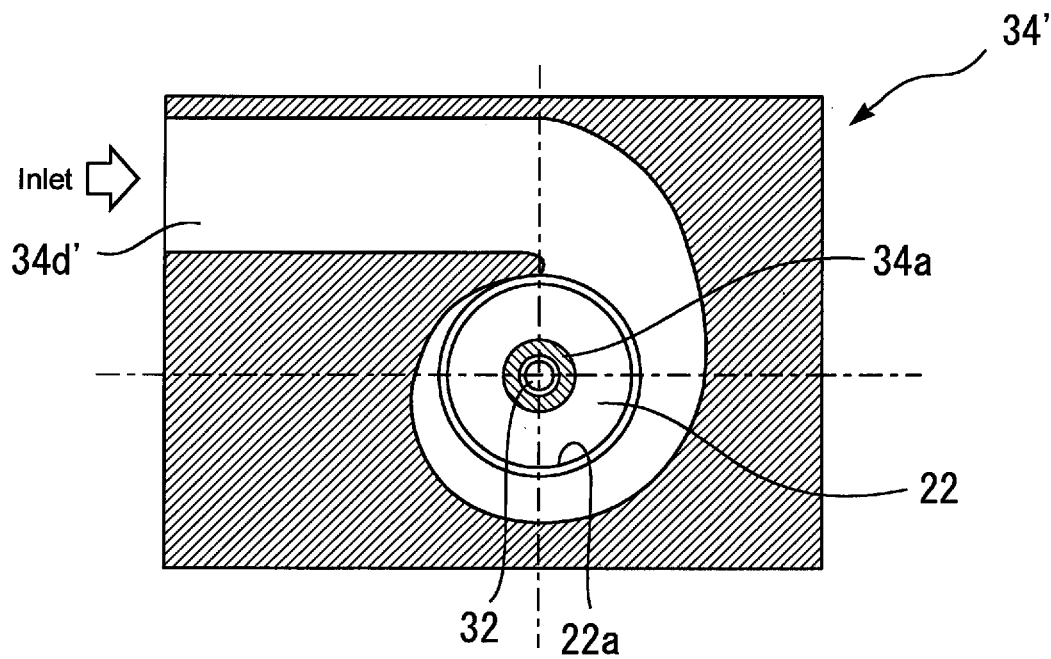
FIG. 4 is a cross-sectional view that schematically illustrates another example of the shape of a compression inlet portion of the compressor housing portion shown in FIG. 1.

FIG. 4 is a cross-sectional view that schematically illustrates another example of the shape of the compression inlet portion of the compressor housing portion 34 shown in FIG. 1. FIG. 4 indicates a cross-section of a compressor housing portion 34' at a position similar to that in FIG. 2. According to the example shown in FIG. 2 described above, the compressor inlet portion 34d is formed so as to uniformly take a gas (air) into the inlet 22a from the whole circumferential direction of the compressor impeller 22.

However, a gas flow passage of the compressor inlet portion may be, for example, formed as in an example shown in FIG. 4, instead of the example shown in FIG. 2. That is to say, in the example shown in FIG. 4, the compressor inlet portion 34d' is formed, immediately above the inlet 22a of the compressor impeller 22, so as to have a scroll shape that the flow passage cross-sectional area gradually becomes smaller when the gas becomes closer to the inlet 22a.

2. Second Embodiment

Next, a second embodiment according to the present disclosure will be described with reference to FIG. 5.

2-1. Configuration of Main Part of Internal Combustion Engine

Figure 5:
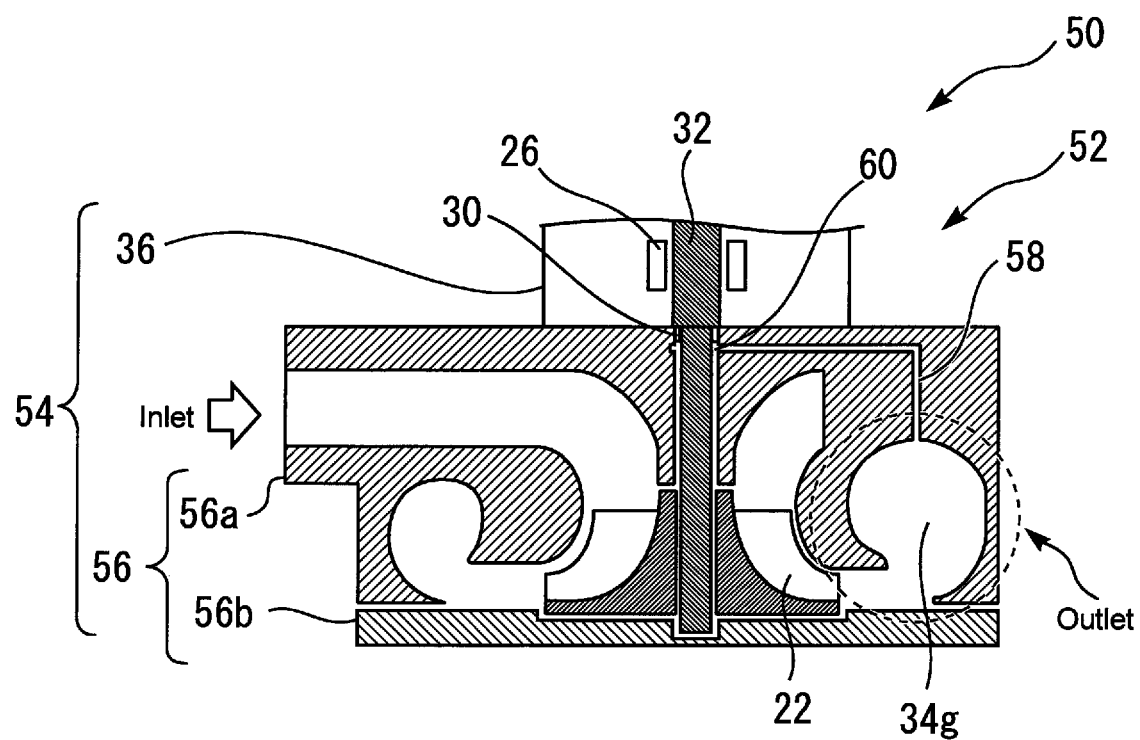
FIG. 5 is a diagram that schematically illustrates the configuration of a main part of an internal combustion engine according to a second embodiment of the present disclosure.

FIG. 5 is a diagram that schematically illustrates the configuration of a main part of an internal combustion engine 50 according to the second embodiment of the present disclosure. The internal combustion engine 50 according to the present embodiment is different from the internal combustion engine 10 according to the first embodiment in terms of the configuration of the centrifugal compressor.

As shown in FIG. 5, the internal combustion engine 50 is equipped with a turbocharger 52. The turbocharger 52 includes a housing 54. The housing 54 includes, as well as the bearing housing portion 36, a compressor housing portion 56 having a pair of housing pieces 56a and 56b.

In the housing piece 56a of the compressor housing portion 56, a communication passage 58 is formed. The communication passage 58 communicates between a gap 60 and the scroll portion 34g with each other. This gap 60 is located between (an inner peripheral surface of) the housing piece 56a and (an outer peripheral surface of) the rotational shaft 32 at a location closer to the compressor impeller 22 than the oil seal portion 30. In more detail, according to the example shown in FIG. 5, in order to create a desired volume, the gap 60 is formed as a space including a pressure chamber (for example, annular groove shape) that is formed on the side of the housing piece 56a. It should be noted that the "gap" according to the present disclosure may not be accompanied by an annular pressure chamber, instead of the example shown in FIG. 5. In addition, another example of this gap may use a pressure chamber (for example, annular groove shape) that is formed on the side of the rotational shaft 32, instead of or in addition to on the side of the housing piece 56a.

2-2. Advantageous Effects

If the compressor impeller 22 is arranged such that the inlet 22a of the compressor impeller 22 becomes closer to the turbine wheel 24 than the outlet 22b thereof similarly to the configuration according to the first embodiment, the following issue may occur. That is to say, if this configuration is adopted, not the back side of the compressor impeller 22 (i.e., the high-pressure side) but the side of the inlet 22a (i.e., the low-pressure side) becomes closer to the bearings 26 in the interior of the compressor housing portion 34. As a result, there is a possibility that oil (lubrication oil) supplied to the bearings 26 may pass through the oil seal portion 30 and be sucked out to the side of the compressor inlet portion 34d.

In view of the issue described above, the turbocharger 52 according to the present embodiment is provided with the communication passage 58. Thus, the pressure of the gas in the scroll portion 34g that has risen by the supercharging can be applied to the gap 60 (i.e., pressure chamber) through the communication passage 58. As a result, the oil passing through the oil seal portion 30 and flowing into the side of the compressor inlet portion 34d can be reduced.

It should be noted that, in order to address the issue described above, the following configuration may be adopted, instead of or in addition to the example in which the communication passage 58 is included as in the second embodiment described above. Specifically, an annular groove may alternatively be formed on the inner peripheral surface of the housing piece 56a at a location closer to the compressor impeller 22 relative to the oil seal portion 30. In addition, this kind of annular groove may be formed on the outer peripheral surface of the rotational shaft 32 opposed to the inner peripheral surface, instead of or in addition to the inner peripheral surface. If this kind of groove is formed, the gas that has flown into the interior of the groove from the side of the bearings 26 expands, and, as a result, the pressure of the gas decreases. Therefore, the oil passing through the oil seal portion 30 and flowing into the side of the compressor inlet portion 34d as well as the gas can be reduced.

3. Other Embodiments

3-1. Other Examples of Installation of Turbocharger

In the first embodiment described above, the turbocharger 20 is installed on the cylinder head 14. This also applies to the turbocharger 52 according to the second embodiment. However, the installation locations of the "turbocharger" according to the present disclosure on the internal combustion engine are not limited to the example described above. That is to say, the turbocharger may alternatively be installed on, for example, the internal combustion engine such that an axial flow turbine wheel is arranged in a portion of an exhaust gas passage located outside a cylinder head. More specifically, in this example, a housing of the turbocharger may house a turbine wheel and include a turbine housing portion having a scroll portion similar to the scroll portion 44 located on the outlet side of turbine blades.

Also, the turbocharger according to the present disclosure may be, for example, fastened, on an outer surface of the cylinder head 14 in a manner similar to the first embodiment, at any one of side surfaces in the row direction of the cylinders 12, instead of a side surface on the exhaust side of the cylinder head 14 in the example shown in FIG. 1.

Furthermore, in the first embodiment, the housing 28 (bearing housing portion 36) of the turbocharger 20 is fastened to the cylinder head 14 such that the rotational shaft 32 becomes perpendicular to the side surface of the cylinder head 14. This also applies to the second embodiment. However, the example of installation of the "housing" according to the present disclosure with respect to a cylinder head is not limited to the example described above, as long as the housing is fastened to the cylinder head "such that a turbine wheel is opposed to the cylinder head". That is to say, the housing may alternatively be installed such that the rotational shaft is not perpendicular to the side surface of the cylinder head but is inclined in a desired direction.

3-2. Another Example of Axial Flow Turbine

In the first and second embodiments described above, the number (number of stages) of sets of the turbine blades 24b of the turbine wheel 24 is one. However, in order to increase the number of stages to the desired number of stages, the "axial flow turbine" according to the present disclosure may include a plurality sets of turbine blades arranged in a row in the direction of the rotational shaft instead of the example described above. It should be noted that, in an example in which a plurality of sets of turbine blades are included, an inlet of a set of turbine blades located on the uppermost stream side of the exhaust gas flow corresponds to an example of the "inlet of the turbine blades" mentioned in the present disclosure, and an outlet of a set of turbine blades located on the lowermost stream side of the exhaust gas flow corresponds to an example of the "outlet of the turbine blades" mentioned in the present disclosure.

The embodiments and modification examples described above may be combined in other ways than those explicitly described above as required and may be modified in various ways without departing from the scope of the present disclosure.

What is claimed is:

1. A turbocharged internal combustion engine system comprising:
   an internal combustion engine; and
   a turbocharger including:
   a single centrifugal compressor impeller including a single inlet and an outlet;
   an axial flow turbine wheel coupled to the centrifugal compressor impeller via a rotational shaft, the inlet of the centrifugal compressor impeller being closer to the axial flow turbine wheel than the outlet of the centrifugal compressor impeller such that the centrifugal compressor impeller is configured to create a pressure differential that results in a force directed towards the axial flow turbine wheel, the axial flow turbine wheel being coupled to the rotational shaft such that an outlet of a plurality of turbine blades of the axial flow turbine wheel is disposed on a side facing the centrifugal compressor impeller;
   a bearing that supports the rotational shaft; and
   a housing that houses the single centrifugal compressor impeller, the bearing, and the axial flow turbine wheel.

2. The turbocharged internal combustion engine system according to claim 1, wherein:
   the bearing is disposed on the rotational shaft and between the centrifugal compressor impeller and the axial flow turbine wheel,
   the turbocharger includes:
   a scroll portion configured to receive gas flowing out from the centrifugal compressor impeller; and
   an oil seal portion interposed between a portion of the housing located between the bearing and the centrifugal compressor impeller, and the rotational shaft, and the housing includes a communication passage communicating a gap with the scroll portion, the gap being formed between the housing and the rotational shaft at a location closer to the centrifugal compressor impeller than the oil seal portion.

3. The turbocharged internal combustion engine system according to claim 1, wherein:

the internal combustion engine includes a cylinder head, and the housing is fastened to the cylinder head either (i) directly or (ii) with a gasket interposed between the housing and the cylinder head such that the axial flow turbine wheel is opposed to the cylinder head.

* * * * *